United States Patent [19]
Kellner

[11] Patent Number: 6,072,583
[45] Date of Patent: Jun. 6, 2000

[54] APPARATUS AND METHOD FOR DETECTING MIS-ORIENTED FASTENERS

[75] Inventor: Robert J. Kellner, Orchard Park, N.Y.

[73] Assignee: General Electro Mechanical Corp., West Seneca, N.Y.

[21] Appl. No.: 08/761,165

[22] Filed: Dec. 6, 1996

[51] Int. Cl.[7] .............................. G01B 11/00; B21J 15/28
[52] U.S. Cl. .............................. 356/375; 227/6; 227/119; 356/237.1
[58] Field of Search .................................. 356/375, 237; 227/2, 5, 6, 119

[56] References Cited

U.S. PATENT DOCUMENTS

| | | | |
|---|---|---|---|
| 4,017,721 | 4/1977 | Michaud | 235/151.3 |
| 4,808,000 | 2/1989 | Pasciak | 356/375 |
| 5,309,223 | 5/1994 | Konicek et al. | 356/375 |
| 5,440,391 | 8/1995 | Smeyers et al. | 356/375 |
| 5,461,480 | 10/1995 | Yamada et al. | 356/375 |
| 5,467,186 | 11/1995 | Indo et al. | 356/375 |
| 5,570,993 | 11/1996 | Onodera et al. | 356/375 |
| 5,619,328 | 4/1997 | Sakurai | 356/375 |

*Primary Examiner*—Frank G. Font
*Assistant Examiner*—Zandra V. Smith
*Attorney, Agent, or Firm*—Hodgson, Russ, Andrews Woods & Goodyear LLP

[57] ABSTRACT

In an automatic fastening machine for installing fasteners in a workpiece provided with a hole for receiving a fastener having a longitudinal axis, wherein a work axis extends through the hole and wherein the fastener is held in a holding position prior to installation in the hole so that the fastener is oriented with the longitudinal axis thereof parallel to the work axis, a method and apparatus for detecting tipped or mis-oriented fasteners while in the holding position and prior to being upset in the workpiece, the method and apparatus utilizing at least one beam of energy which is influenced by the fastener orientation. Energy is radiated along at least one path intersecting the fastener when in the holding position and the radiated energy is received and a response is given to the amount of energy interrupted by the fastener in a manner providing an indiction if the fastener longitudinal axis is not parallel to the work axis. Preferably, the energy is radiated along two paths disposed at angles to each other and intersecting in a manner such that when the fastener longitudinal axis is parallel to the work axis, equal amounts of energy are interrupted, and when the fastener is mis-oriented unequal amounts of energy are interrupted thereby providing an indication of fastener mis-orientation. The energy comprises a laser beam in the form of a band having a width extending between longitudinally extending edges of the band. Two laser beam bands are disposed at angles and with an edge of each band intersecting the longitudinal axis of the fastener whereby in any mis-oriented disposition of the fastener, unequal amounts of the beams are interrupted thereby providing an indication of the mis-oriented fastener. The indication of a tipped or mis-oriented fastener is immediately signaled to the machine control to stop the machine or take whatever corrective action is appropriate to avoid damage to the workpiece. The accuracy and effectiveness of the method and apparatus of the present invention provides a level of confidence in tipped fastener detection thereby avoiding any need to slow the fastnener insertion cycle and even allowing an increase in fastener insertion speed so as to increase the overall production rate.

16 Claims, 5 Drawing Sheets

APPARATUS AND METHOD FOR DETECTING MIS-ORIENTED FASTENERS

TECHNICAL FIELD

This invention relates to the art of automatic fastening machines, and more particularly to a new and improved machine having a, method and means for detecting mis-oriented fasteners prior to installation in a workpiece.

Automatic fastening machines are well known and have particular application in the fabricating and assembly of aircraft structures. Such a machine utilizes a controlled transfer head that selectively positions various tools carried by the machine for sequential operation on a workpiece. For example, the transfer head positions a motorized drill relative to the workpiece, and a fastener receiving hole is drilled therein. At the same time, a fastener such as a rivet from a storage mechanism is injected or otherwise positioned into fingers on a fastener installation or upsetting tool. The transfer head then removes the drill from the workpiece, moves it out of alignment with the hole, and then moves the fastener installation tool into position in alignment with the hole to release the rivet from the fingers and insert the rivet into the hole for upsetting it therein.

It is important that the fastener or rivet be properly aligned or oriented while held by the fingers of the installation tool prior to upsetting in the workpiece. Otherwise, a tipped or mis-oriented fastener can cause damage to the workpiece during the upsetting operation which requires repair of the workpiece resulting in production delays and increased production cost. Fasteners can become mis-oriented due to a number of causes such as improper operation of the fastener injection assembly, damage to the fastener holding fingers, or cocking of the fastener while in the fingers during transfer from the holding position to the fastener installation position. Prior attempts to solve the tipped or mis-oriented fastener problem have included slowing down the fastener insertion cycle so that a tipped fastener would not damage the workpiece surface, but this undesirably lengthens the overall fastener installation cycle thereby decreasing the production rate.

It would, therefore, be highly desirable to provide a new and improved automatic fastening machine and method of operation which detects mis-oriented fasteners prior to installation in a workpiece in an effective manner so that appropriate corrective measures can be taken to avoid workpiece damage and so that the overall production rate during normal fastener installation is not decreased.

SUMMARY OF THE INVENTION

The present provides, in an automatic fastening machine for installing fasteners in a workpiece provided with a hole for receiving a fastener having a longitudinal axis, wherein a work axis extends through the hole and wherein the machine includes means for holding a fastener in a holding position prior to installation in the hole so that the fastener is oriented with the longitudinal axis thereof parallel to the work axis, a method and apparatus for detecting tipped or mis-oriented fasteners while in the holding position and prior to being upset in the workpiece, the method and apparatus utilizing at least one beam of energy which is influenced by the fastener orientation. There is provided means for radiating energy along at least one path intersecting the fastener when in the holding position and means for receiving the radiated energy and responsive to the amount of energy interrupted by the fastener in a manner providing an indication if the fastener longitudinal axis is not parallel to the work axis. Preferably, the energy is radiated along two paths disposed at angles to each other and intersecting in a manner such that when the fastener longitudinal axis is parallel to the work axis, equal amounts of energy are interrupted, and when the fastener is mis-oriented unequal amounts of energy are interrupted thereby providing an indication of fastener mis-orientation. The energy comprises a laser beam in the form of a band having a width extending between longitudinally extending edges of the band. Two laser beam bands are disposed at angles and with an edge of each band intersecting the longitudinal axis of the fastener whereby in any mis-oriented disposition of the fastener, unequal amounts of the beams are interrupted thereby providing an indication of the mis-oriented fastener. The indication of a tipped or mis-oriented fastener is immediately signaled to the machine control to stop the machine or take whatever corrective action is appropriate to avoid damage to the workpiece. The accuracy and effectiveness of the method and apparatus of the present invention provides a level of confidence in tipped fastener detection thereby avoiding any need to slow the fastener insertion cycle and even allowing an increase in fastener insertion speed so as to increase the overall production rate.

The foregoing and additional advantages and characterizing features of the present invention will become clearly apparent upon a reading of the ensuing detailed description together with the included drawing wherein:

DETAILED DESCRIPTION OF THE ILLUSTRATED EMBODIMENT

Figure 1:
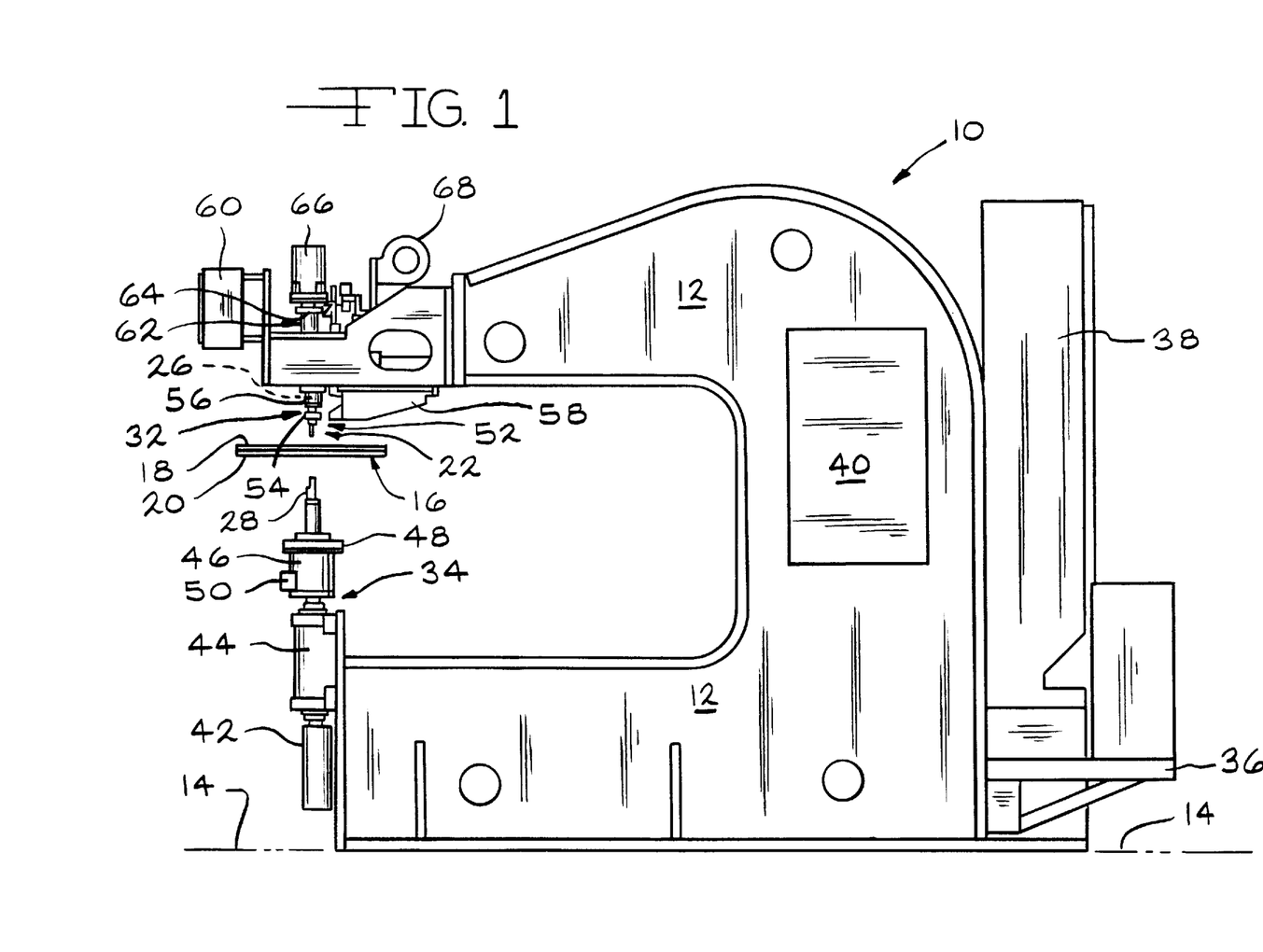
FIG. 1 is a side elevational view of a typical automatic fastening machine to which the present invention is applicable.

FIG. 1 shows one form of an illustrative automatic fastening machine to which the present invention is applicable, and the machine is an automatic drilling and riveting machine generally designated 10. Machine 10 includes a generally C-shaped frame 12 supported on a surface 14, such as the floor of a factory. Briefly, a workpiece 16 comprising two metal work sheets 18, 20 to be joined is introduced into the C-shaped jaws of the machine 10 and clamped together by pneumatic and/or hydraulic pressure in a known manner. This holds sheets 18, 20, during the drilling operation, assuring exact hole positioning and alignment. Typically the first operation performed by machine 10 on workpiece 16 is drilling a hole at a location where the center of the hole is on what is known in the art as a work axis or centerline which, is disposed perpendicular to the plane of the surface of the workpiece surrounding the hole. A tool 22 is provided for inspecting the hole. A rivet (not shown) is inserted in the hole and squeezed or upset therein by hydraulic pressure applied from above by a bucking ram 26 and from below by a lower anvil 28.

In accordance with the present invention, when a rivet is held by fingers (not shown in FIG. 1) on bucking ram 26 prior to insertion in the hole, a pair of angularly disposed laser beams are directed on the rivet, and the extent to which the beams are interrupted by the rivet is utilized to indicate whether or not the rivet is properly oriented. In not, a tipped rivet condition is immediately signaled to the machine control so that appropriate action can be taken to avoid damage to the workpiece.

Before the present invention is described in detail, it is believed that a further description of the structure and operation of machine 10 will be helpful to facilitate a better understanding of the invention and its advantages. Machine 10 includes an upper head assembly 32 and a lower head assembly 34, both carried by frame 12. Both upper and lower assemblies 32 and 34, respectively, are mounted on frame 12 so that a work centerline alignment is maintained between their respective tooling, i.e. the lower anvil 28 and selectively an upper head tool such as the drill, the bucking ram, the hole inspection tool, and a milling or shaving tool. Platform 36 at the right-hand end of machine 10 as viewed in FIG. 1 is part of an hydraulic pumping assembly on this end of frame 12, and electrical controls are located within a housing 38 on frame 12 adjacent platform 36. Hydraulic controls are located on a panel 40 mounted on the web or central vertical section of frame 12. Pneumatic controls are located on a panel (not shown) at a corresponding location on the opposite side of frame 12. The electrical, hydraulic and pneumatic controls are collectively referred to as the machine control.

The lower head assembly 34 includes an upset cylinder 42 and a lower ram 44 combined to form a tandem cylinder, a clamp cylinder 46, a turntable 48 and the lower anvil 28. Operation of lower head assembly 34 is monitored by a lower head controller connected to the machine central processor and mounted on clamp cylinder 46. The lower head controller receives inputs from an upset force sensor and an upset pressure sensor both mounted on upset cylinder 42 and inputs from a clamp force sensor and clamp position detector mounted on clamp cylinder 46. A clamp position detector outputs to the lower head controller a voltage signal proportional to he linear displacement of clamp 46. The lower ram 44 is free to reciprocate vertically along the work centerline or axis within a cylindrical cavity. Upset cylinder 42 moves lower ram 44 as necessary to perform the upsetting operation.

The upper head assembly 32 includes a pressure foot assembly, generally designated 52, which is the upper member of the clamping arrangement of machine 10. The workpiece 16 is clamped against the lower surface of a pressure foot bushing (not shown in FIG. 1) depending from a pressure foot plate of the upper head assembly 32 by pressure from the lower ram assembly 44, which raises the lower anvil 28 against the lower surface of workpiece 16. The pressure foot assembly 52 of the illustrated automatic fastening machine 10 preferably includes a pair of spaced apart pneumatic cylinders, one of which is designated 56 and the other of which is parallel to and rearward thereof as viewed in FIG. 1 that provide rigid clamping pressure on the upper surface of workpiece 16 during the drilling and hole inspection operations and provide resilient pressure during upset of the rivet to prevent dimpling of the workpiece. The upper head assembly 32 also includes a hopper 58 for holding a supply of rivets, an injector assembly (not shown) for transferring individual rivets from hopper 58 to fingers (not shown in FIG. 1) on bucking ram 26, and an operator console panel 60 containing various controls for machine 10.

The upper head assembly 32 further includes a drill spindle assembly, generally designated 62, for drilling the rivet receiving hole in the workpiece 16 and an upper anvil (not shown in FIG. 1) associated with bucking ram 26. An encoder is associated with the upper anvil and another encoder is associated with the bucking ram 26. These encoders supply the upper head controller with traveling movement information for processing by the central processor. The rivet fingers, which will be shown and described in further detail presently, provide for catching and holding or supporting the rivet released from hopper 58 via the injector assembly. This occurs after the hole probe 22 has moved along the work centerline or axis to be positioned inside the hole to thereby determine that the hole has been drilled to specification including being aligned along the work centerline. Movement of hole probe 22 is signaled to the transfer assembly by a hole probe encoder connected to a transfer assembly controller. The bucking 26 ram then provides for bucking the rivet head with the anvil while upset pressure is applied from below by the lower ram 44. Bucking ram pressure is controlled by a sensor connected to the transfer controller.

The drill spindle assembly 62 includes a drill ram 64 movable linearly toward and away from workpiece 16. The drill spindle is rotatably mounted in drill ram 64 and is provided with a depending drilling tool facing the workpiece 16. Rotational movement of the drill spindle is provided in the illustrated apparatus by a direct drive electric or hydraulic motor 66 while drilling thrust and feed are measured by a sensor and an encoder and fed to a drill controller. Motor 66 is carrier by ram 64 and the output shaft of motor 66 is directly connected to the drill spindle such that the respective axes of rotation of the motor output shaft and drill spindle are coincident. If motor 66 is electric, a fan 68 preferably is provided to cool motor 66 during operation of machine 10.

Figure 2:
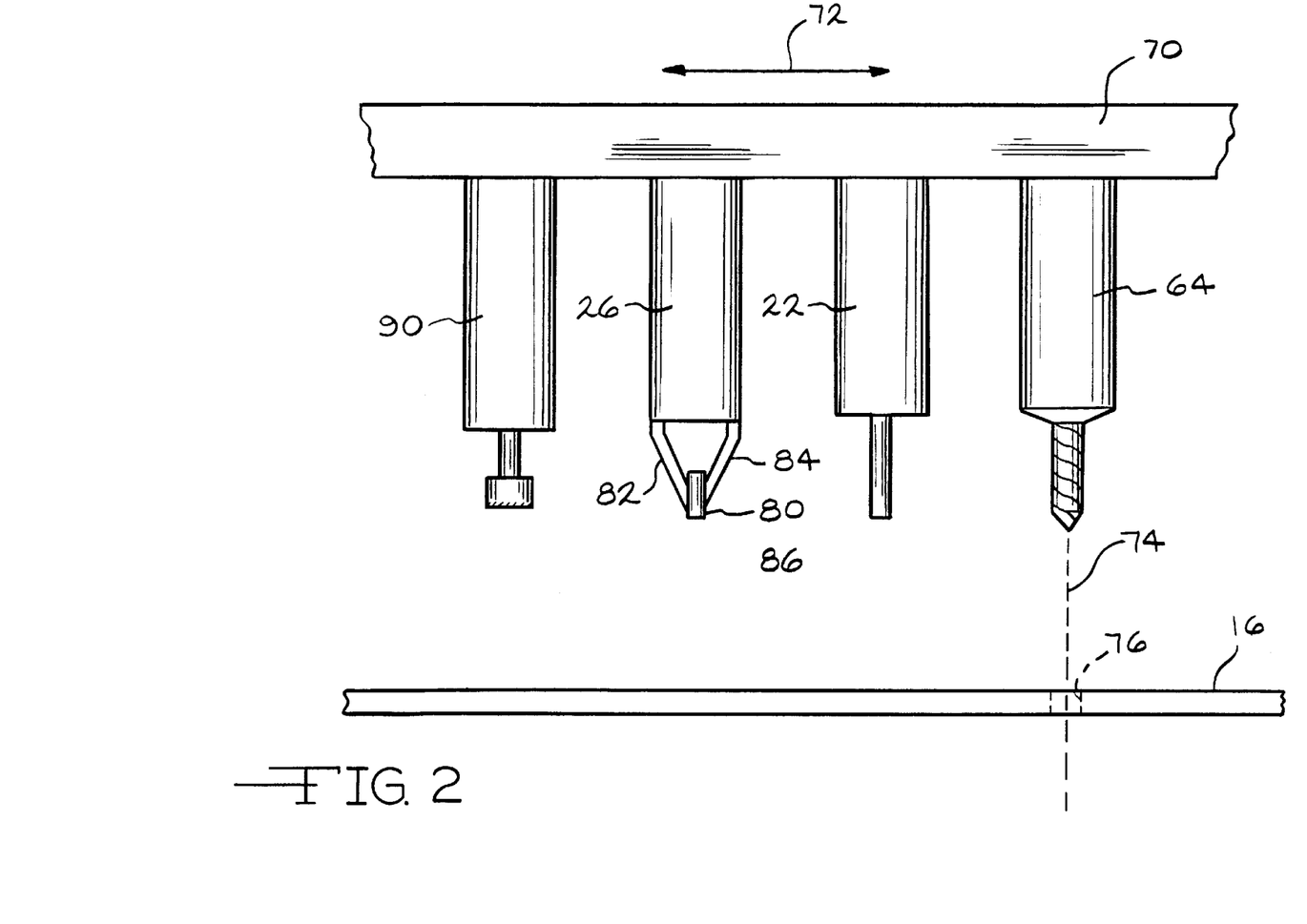
FIG. 2 is a diagrammatic view showing a plurality of tools carried by transfer mechanism in the machine of FIG. 1.

FIG. 2 illustrates an arrangement of the tools of machine 10 carried by a transfer means 70 for movement along a transfer path in the direction of arrows 72. In the position of the tools illustrated in FIG. 2, drill 64 is positioned by transfer means 70 so that the longitudinal axis of drill 64 is in alignment with the work axis or centerline designated 74 in FIG. 2 which extends through the center of the location on workpiece 16 where the hole 76 is to be drilled. As previously described, during the drilling operation the injector mechanism has placed a rivet 80 within fingers 82, 84 carried by the bucking ram 26. FIG. 2 shows rivet 80 in a holding position, prior to installation in the workpiece 16, and in proper orientation with the longitudinal axis 86 of rivet 80 disposed parallel to the work axis 74. When the drilling operation is completed, transfer means 70 moves drill 64 out of alignment with work axis 74 in a direction to the right as viewed in FIG. 2 and then moves the inspection tool or hole probe 22 into alignment with work axis 74 for movement toward and away from workpiece 16 and into and out of hole 76 for Inspecting the same. After the hole inspection, transfer means moves tool 22 out of alignment with work axis 74 in a direction to the right as viewed in FIG. 2 and then moves bucking ram 26 into alignment with work axis 74 for inserting rivet 80 into hole 76 and upsetting it therein. According to a preferred mode of the present invention, the orientation of rivet 80 is inspected at this location of rivet 80 prior to insertion in hole 76 which location is designated a holding position. After a properly oriented rivet 80 is released from fingers 82, 84 by operation of the anvil of the bucking ram 26 and upset within hole 76 of workpiece 16, bucking ram 26 is moved out of alignment with work axis 74 and a milling or shaving tool 90 is moved into alignment with work axis 74 for performing a milling or shaving operation on the head of the upset rivet in a known manner.

Figure 3:
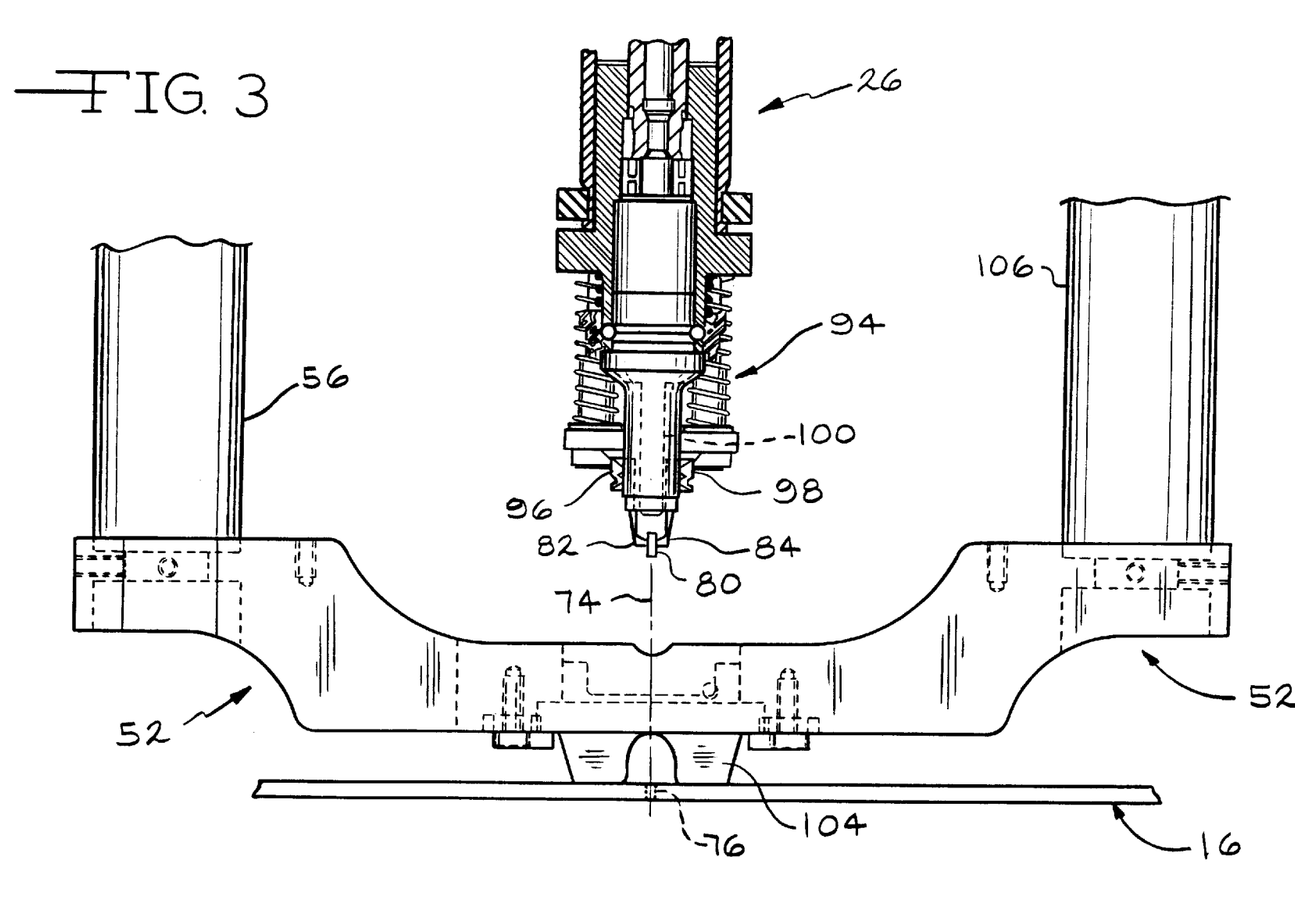
FIG. 3 is a sectional view, partly diagrammatic, illustrating the upper anvil with rivet carrying fingers in the machine of FIG. 1 and also showing the pressure foot assembly thereof.

FIG. 3 shows in further detail the fingers 82, 84 on bucking ram 26 and the relative location between bucking ram 26 and the pressure foot assembly 52 of machine 10 when bucking ram 26 is in alignment with work axis 74 prior to being moved toward workpiece 16 to insert rivet 80 into hole 76 and upset it therein. Fingers 82, 84 are pivotally connected to a spring biased finger holding assembly, generally designated 94, on the bucking ram at the axes designated 96 and 98, respectively, for pivotal outward movement when the anvil 100 of bucking ram 26 descends as viewed in FIG. 3 to push rivet 80 out of the fingers and into the hole 76 in workpiece 16 in a known manner. The pressure foot assembly 52 includes a pressure foot bushing 104 which is moved into and out of clamping contact with workpiece 16 by the pair of pneumatic cylinders 56 and 106 in a known manner. In the relative locations of bucking ram 26, work axis 74 and pressure foot assembly 92 illustrated in FIG. 3, the orientation of rivet 80 is inspected by the method and apparatus of the present invention which now will be described in detail.

Figure 4:
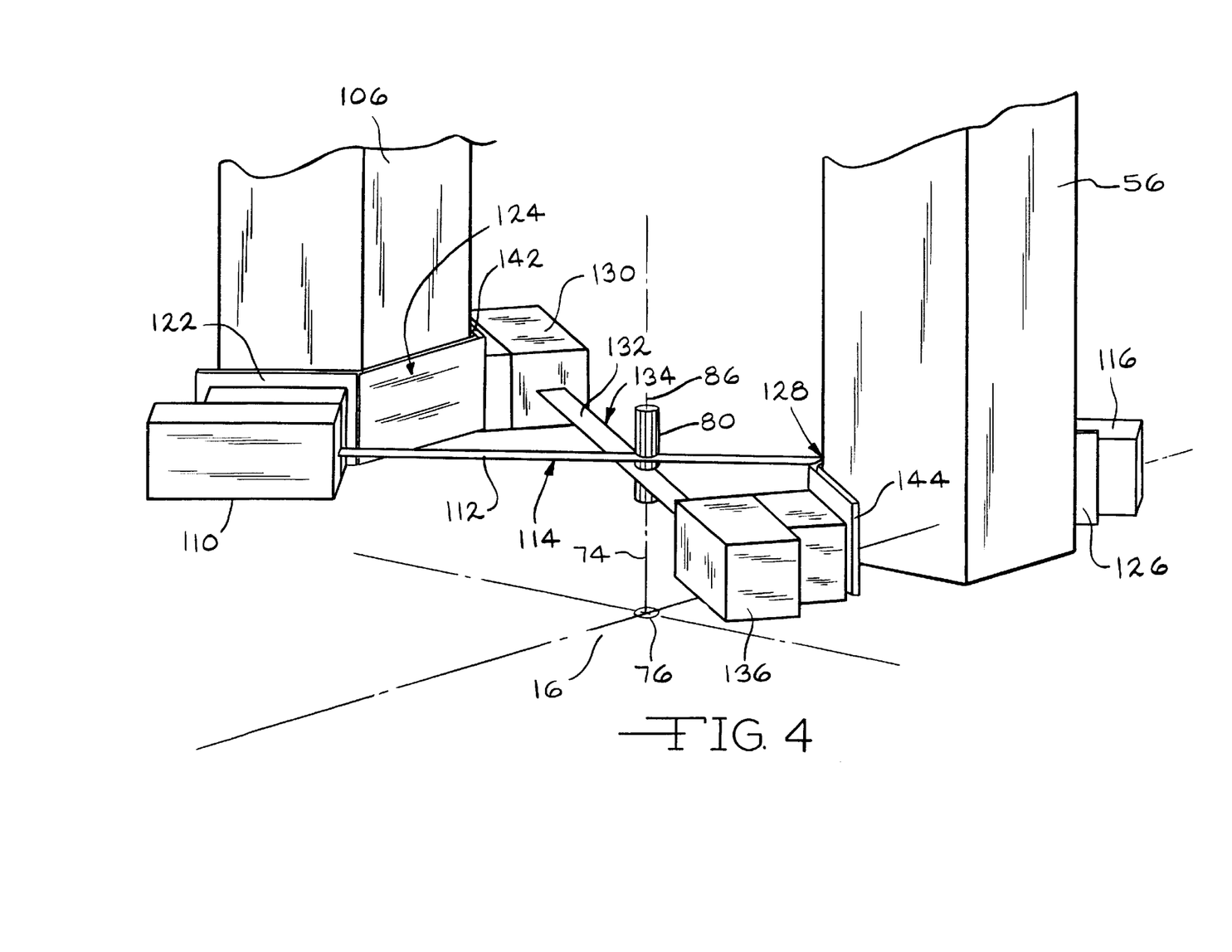
FIG. 4 is a diagrammatic perspective view illustrating the method and a apparatus of the present invention.

Referring to FIG. 4, the fastener or rivet 80 is shown in a holding position prior to insertion in hole 76 of workpiece 16, being held by fingers 82, 24 (not shown in FIG. 4) of bucking ram 26 (not shown in FIG. 4). In the holding position of FIG. 4, the longitudinal axis 86 of rivet 80 is coincident with the centerline or work axis 74. The apparatus of the present invention comprises means for radiating energy along at least one path intersecting fastener 80 when in the holding position and means for receiving the radiated energy and responsive to the amount of energy interrupted by fastener 80 in a manner providing an indication if the fastener longitudinal axis 86 is not parallel to the work axis 74. In other words, if rivet 80 is properly oriented, it will interrupt a predetermined amount of the energy, and if rivet 80 is mis-oriented it will interrupt a different amount of energy. This is utilized to signal mis-orientation of rivet 80 to the appropriate portion of the machine control so that stopping the fastener insertion cycle of machine 10 or other appropriate action can be taken to prevent damage to workpiece 16. In the apparatus of FIG. 4, an emitter 110 of a laser beam sensor emits a laser beam 112 along a path 114 which intersects rivet 80 in the holding position. A receiver 116 of the laser beam sensor receives the laser beam 112 and is responsive to the amount that beam 112 is interrupted by rivet 80. In the illustrative arrangement of FIG. 4, emitter 110 is carried by one leg 122 of a bracket 124 mounted on the stationary housing of pressure foot cylinder 106, and receiver 116 is carried by one leg 126 of a bracket 128 mounted on the stationary housing of pressure foot cylinder 56.

Preferably, the means for radiating energy according to the present invention provides two paths of energy disposed at angles to each other and intersecting the fastener, and the means for receiving the radiated energy receives energy along both paths. In the apparatus shown in FIG. 4, an emitter 130 of a second laser beam sensor emits a laser beam 132 along a path which intersects rivet 80 in the holding position. Receiver 136 of the second laser beam sensor receives the laser beam 132 and is responsive to the amount of beam 132 interrupted by rivet 80. In the illustrative arrangement of FIG. 4, emitter 130 is carried by the other leg of bracket 124, and receiver 136 is carried by the other leg 144 of bracket 128. According to a preferred mode of the present invention, paths 114 and 134 intersect such that when the longitudinal axis 86 of rivet 80 is parallel to work axis 74, equal amounts of energy, i.e. of the laser beam, are interrupted. The paths 114, 134 preferably are substantially at right angles to each other.

Figure 5:
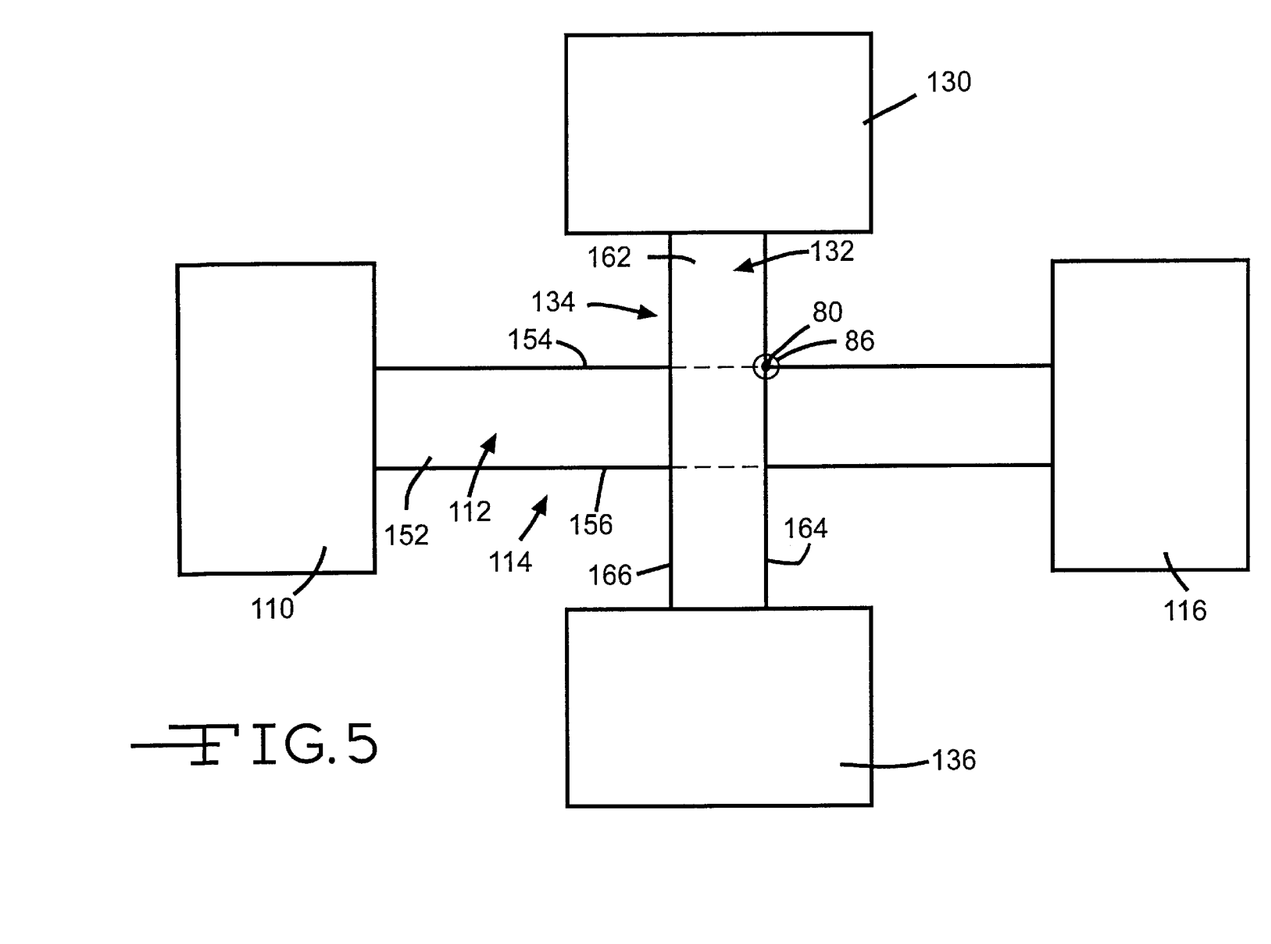
FIG. 5 is a diagrammatic view illustrating the operation of the apparatus of FIG. 4.

Advantageously, the laser beam sensors including the emitter 110-receiver 116 pair and the emitter 130-receiver 136 pair both produce a laser beam in the form of a band. In particular, and as shown in FIG. 5, laser beam 112 is in the form of a band 152 having a width extending between a pair of longitudinally extending, substantially parallel edges 154 and 156, the band 152 being disposed so that the portion thereof between edges 154, 156 lies in a plane disposed substantially perpendicular to the work axis 74. Band 152 is positioned so that one of its longitudinal edges, for example edge 154, intersects the longitudinal axis 86 of rivet 80 when in the holding position. Similarly, laser beam 132 is in the form of a band 162 having a width extending between a pair of longitudinally extending substantially parallel edges 164, 166, the band 162 being disposed so that the portion thereof between edges 164, 166 lies in a plane disposed substantially perpendicular to the work axis 74. Band 162 is positioned so that one of the longitudinal edges, for example edge 164, intersects the longitudinal axis 86 of rivet 80 when in the holding position.

By way of example, in an illustrative method and apparatus for detecting tipped rivets according to the present invention, each emitter-receiver pair 110–116 and 130–136 is commercially available from SUNX under the designation LA 511 laser beam sensor.

From an inspection of the arrangement of FIG. 5, wherein an edge of each laser beam band intersects the longitudinal 86 axis of rivet 80, one can see that when rivet 80 moves in any direction from the desired orientation shown in FIG. 5, unequal amounts of the laser beams will be interrupted thereby providing an indication or signal that rivet 80 is mis-oriented. The method and apparatus of the present invention is extremely effective and accurate in detecting tipped or mis-oriented fasteners. This provides a very high level of confidence in detection of tipped or mis-oriented fasteners before any attempt to upset them in the workpiece so that the fastener insertion cycle can be interrupted or other appropriate action taken by the machine control to prevent damage to the workpiece. This avoids any need to slow any portion of the fastener insertion cycle to prevent tipped fasteners from damaging the workpiece. In fact, this high level of confidence in detection can allow increasing the speed of the fastener insertion cycle if desired thereby increasing the overall production rate of machine 10.

It is therefore apparent that the present invention accomplishes its intended objects. While an embodiment of the present invention has been described in detail, that is done for the purpose of illustration, not limitation.

I claim:

1. In an automatic fastening machine for installing fasteners in a workpiece provided with a hole for receiving a fastener having a longitudinal axis and wherein a work axis extends through the hole and wherein the machine includes means for holding a fastener in a holding position prior to installation in the hole so that the fastener is oriented with the longitudinal axis thereof parallel to the work axis:

a) means for radiating energy along at least one path intersecting the fastener when in the holding position;

b) means for receiving the radiated energy and responsive to the amount of energy interrupted by the fastener in a manner providing an indication if the fastener longitudinal axis is not parallel to the work axis; and c) wherein the energy is in the form of a band having a width extending between a pair of longitudinally extending, substantially parallel edges, said band being disposed so that the portion thereof between said edges is in a plane perpendicular to said work axis.

2. Apparatus according to claim 1, wherein said band is positioned so that one of said edges intersects the longitudinal axis of said fastener when in said holding position.

3. In an automatic fastening machine for installing fasteners in a workpiece provided with a hole for receiving a fastener having a longitudinal axis and wherein a work axis extends through the hole and wherein the machine includes means for holding a fastener in a holding position prior to installation in the hole so that the fastener is oriented with the longitudinal axis thereof parallel to the work axis:
 a) means for radiating energy along at least one path intersecting the fastener when in the holding position;
 b) means for receiving the radiated energy and responsive to the amount of energy interrupted by the fastener in a manner providing an indication if the fastener longitudinal axis is not parallel to the work axis; and
 c) wherein said means for radiating energy provides two paths of energy disposed at angles to each other and intersecting the fastener and wherein said means for receiving radiated energy receives energy along both paths; and
 d) wherein the energy is in the form of a pair of bands each having a width extending between a pair of longitudinally extending, substantially parallel edges, said bands being disposed so that the portions thereof between said edges are in planes perpendicular to said work axis.

4. Apparatus according to claim 3, wherein said bands are positioned so that an edge of each band intersects the longitudinal axis of said fastener when in said holding position.

5. In an automatic fastening machine for installing fasteners in a workpiece provided with a hole for receiving a fastener having a longitudinal axis and wherein a work axis extends through the hole and wherein the machine includes means for holding a fastener in a holding position prior to installation in the hole so that the fastener is oriented with the longitudinal axis thereof parallel to the work axis:
 a) means for emitting a laser beam along at least one path intersecting the fastener when in the holding position;
 b) means for receiving the laser beam and responsive to the amount of the beam interrupted by the fastener in a manner providing an indication if the fastener longitudinal axis is not parallel to the work axis; and
 c) wherein the laser beam is in the form of a band having a width extending between a pair of longitudinally extending, substantially parallel edges, said band being disposed so that the portion thereof between said edges is in a plane perpendicular to said work axis.

6. Apparatus according to claim 5, wherein said band is positioned so that one of said edges intersects the longitudinal axis of said fastener when in said holding position.

7. In an automatic fastening machine for installing fasteners in a workpiece provided with a hole for receiving a fastener having a longitudinal axis and wherein a work axis extends through the hole and wherein the machine includes means for holding a fastener in a holding position prior to installation in the hole so that the fastener is oriented with the longitudinal axis thereof parallel to the work axis:
 a) first means for emitting a first laser beam along at least one path intersecting the fastener when in the holding position;
 b) means for receiving the laser beam and responsive to the amount of the beam interrupted by the fastener in a manner providing an indication if the fastener longitudinal axis is not parallel to the work axis;
 c) second means for emitting a second laser beam along a second path intersecting the fastener when in the holding position and second means for receiving the second laser beam and responsive to the amount of the second beam interrupted by the fastener, the two laser beams being disposed at angles to each other; and
 d) wherein said laser beams are in the form of a pair of bands each having a width extending between a pair of longitudinally extending, substantially parallel edges, said bands being disposed so that the portions thereof between said edges are in planes perpendicular to said work axis.

8. Apparatus according to claim 7, wherein said bands are positioned so that an edge of each band intersects the longitudinal axis of said fastener when in said holding position.

9. A method for detecting mis-oriented fasteners prior to installation in a hole of a workpiece by an automatic fastening machine, wherein the fastener has a longitudinal axis and a work axis extends through the hole, and wherein the fastener is held in a holding position prior to installation in the hole of the workpiece with the fastener longitudinal axis disposed parallel to the work axis when the fastener is properly oriented, said method comprising the steps of:
 a) radiating energy along at least one path intersecting the fastener when in the holding position;
 b) receiving the radiated energy and responding to the amount of energy interrupted by the fastener in a manner providing an indication if the fastener longitudinal axis is not parallel to the work axis; and
 c) wherein the energy is in the form of a band having a width extending between a pair of longitudinally extending, substantially parallel edges, said band being disposed so the portion thereof between said edges is in a plane perpendicular to said work axis.

10. A method according to claim 9, wherein said band is positioned so that one of said edges intersects the longitudinal axis of said fastener when in said holding position.

11. A method for detecting mis-oriented fasteners prior to installation in a hole of a workpiece by an automatic fastening machine, wherein the fastener has a longitudinal axis and a work axis extends through the hole, and wherein the fastener is held in a holding position prior to installation in the hole of the workpiece with the fastener longitudinal axis disposed parallel to the work axis when the fastener is properly oriented, said method comprising the steps of:
 a) radiating energy along at least one path intersecting the fastener when in the holding position;
 b) receiving the radiated energy and responding to the amount of energy interrupted by the fastener in a manner providing an indication if the fastener longitudinal axis is not parallel to the work axis;
 c) wherein the energy is radiated along two paths disposed at angles to each other and intersecting the fastener and wherein the radiated energy is received along both paths; and
 d) wherein the energy is in the form of bands each having a width extending between a pair of longitudinally extending, substantially parallel edges, said band being disposed so that the portions thereof between said edges are in planes perpendicular to said work axis.

12. A method according to claim 11, wherein said bands are positioned so that an edge of each band intersects the longitudinal axis of said fastener when in said holding position.

13. A method for detecting mis-oriented fasteners prior to installation in a hole of a workpiece by an automatic fastening machine, wherein the fastener has a longitudinal axis and a work axis extends through the hole, and wherein the fastener is held in a holding position prior to installation in the hole of the workpiece with the fastener longitudinal axis disposed parallel to the work axis when the fastener is properly oriented, said method comprising the steps of:

a) emitting a laser beam along at least one path intersecting the fastener when in the holding position;
   b) receiving the laser beam and responding to the amount of the beam interrupted by the fastener in a manner providing an indication if the fastener longitudinal axis is not parallel to the work axis; and
   c) wherein the laser beam is in the form of a band having a width extending between a pair of longitudinally extending, substantially parallel edges, said band being disposed so that the portion thereof between said edges is in a plane perpendicular to said work axis.

14. A method according to claim 13, wherein said band is positioned so that one of said edges intersects the longitudinal axis of said fastener when in said holding position.

15. A method for detecting mis-oriented fasteners prior to installation in a hole of a workpiece by an automatic fastening machine, wherein the fastener has a longitudinal axis and a work axis extends through the hole, and wherein the fastener is held in a holding position prior to installation in the hole of the workpiece with the fastener longitudinal axis disposed parallel to the work axis when the fastener is properly oriented, said method comprising the steps of:

a) emitting a first laser beam along one path intersecting the fastener when in the holding position;
   b) receiving the laser beam and responding to the amount of the beam interrupted by the fastener in a manner providing an indication if the fastener longitudinal axis is not parallel to the work axis;
   c) emitting a second laser beam along a second path intersecting the fastener when in the holding position and receiving the second laser beam and responding to the amount of the second beam interrupted by the fastener, the two laser beams being disposed at angles to each other; and
   d) wherein said laser beams are in the form of a pair of bands each having a width extending between a pair of longitudinally extending, substantially parallel edges, said bands being disposed so that the portions thereof between said edges are in planes perpendicular to said work axis.

16. A method according to claim 15, wherein said bands are positioned so that an edge of each band intersects the longitudinal axis of said fastener when in said holding position.

* * * * *